March 21, 1961 W. A. BAYFIELD 2,976,421
RADIATION MONITOR
Filed Sept. 27, 1957
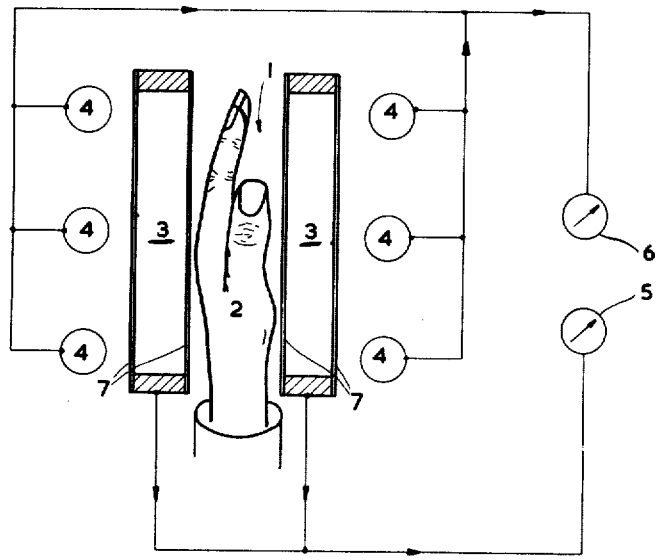
FIG. I
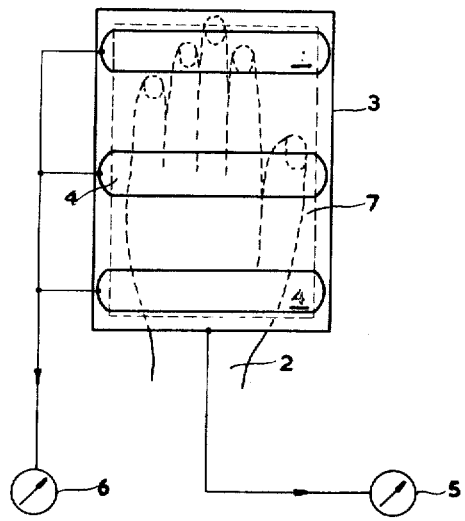
FIG. 2
INVENTOR
WILLIAM ALEXANDER BAYFIELD
BY
AGENT

United States Patent Office 2,976,421
Patented Mar. 21, 1961

2,976,421
RADIATION MONITOR

William Alexander Bayfield, Bromley, England, assignor to North American Philips Company, Inc., New York, N.Y.

Filed Sept. 27, 1957, Ser. No. 686,781

Claims priority, application Great Britain Oct. 5, 1956

2 Claims. (Cl. 250—83.6)

This invention relates to radiation monitors and more particularly to monitors for indicating the degree of contamination by radio-active materials of an article or of a hand or other limb of the human body.

At the present time monitor apparatus used for indicating the degree of contamination by alpha, beta and gamma radiation emitting materials comprise a first monitor for indicating the presence of alpha ray emitting materials, and a second monitor for indicating the presence of beta and gamma ray emitting materials. The first monitor generally includes two proportional counters constituted by a pair of ionisation chambers between and close to each of which the hand, for example, is placed for monitoring purposes in such manner that one chamber is close to the palm of the hand and the other close to the back of the hand. Any alpha ray emitting material contaminating the hand gives rise to an ionisation current in either or both of the ionisation chambers and such current is indicated on a meter. In practice the hand is held between the chambers for a length of time equal to or greater than predetermined time during which predetermined time the reading of the meter increases for a contaminated hand and at the end of which time the meter indicates the degree of contamination thereof. It is usual for a bell to sound during such monitoring when the hand is contaminated beyond a given degree. The second monitor for indicating the presence of beta and gamma ray emitting materials is located in a separate part of the monitor apparatus and includes either a Geiger counter tube which is arranged to scan mechanically over the hand or alternatively includes a plurality of stationary Geiger counter tubes close to which the hand is placed. The procedure for this second monitoring is similar to that described above with respect to the first monitor.

It can be seen, therefore, from the above that the present method of monitoring the hand for both alpha ray emitting materials and beta and gamma ray emitting materials has the disadvantage that several time consuming operations are required, namely, inserting the hand between a pair of ionisation chambers or like proportional counters, maintaining the hand therebetween for a certain time, withdrawing the hand, placing the hand close to one or more Geiger counters, maintaining the hand in that position for a certain time, and withdrawing the hand.

It is an object of the invention to provide an improved monitor apparatus which mitigates the above-mentioned disadvantage.

Apparatus according to one aspect of the invention comprises first means responsive to alpha rays for monitoring the degree of contamination with alpha ray emitting material and second means responsive to beta and/or gamma rays for monitoring the degree of contamination with beta and/or gamma ray emitting material, said second means being arranged in such manner with respect to said first means that any beta and/or gamma rays to which said second means respond pass at least in part through said first means before reaching said second means. Thus with apparatus in accordance with the invention an advantageous time saving is achieved since it is possible to monitor alpha and beta and/or gamma radiation at the same time.

In order that the invention may be readily carried into effect an embodiment thereof will now be described by way of example with reference to the accompanying diagrammatic drawing in which:

Figure 1 shows a view of a monitor apparatus in accordance with the invention for monitoring the hand and in schematic form the associated circuit, and Figure 2 shows a view of the apparatus of Figure 1 looking towards the back of the hand in Figure 1.

In the drawing, reference numeral 1 designates a cavity of zone for receiving a hand 2 suspected of being contaminated with alpha ray emitting material and beta and/or gamma ray emitting material. The cavity 1 is bounded by two proportional counter ionisation chambers 3 positioned close to the hand 2. The chambers 3 can be fixed or alternatively they can be initially more widely spaced than shown so that, when hand 2 is inserted into the cavity 1, they close up on the hand; this may be done, for example, by providing that the hand actuates a micro-switch when inserted into the cavity to the desired extent. Arranged close to the ionisation chambers, on the sides remote from the cavity 1, are a number of Geiger-Müller tubes 4 responsive to beta and/or gamma rays. The ionisation chambers 3 are associated with a meter 5 and the Geiger-Müller counter tubes 4 with a meter 6.

The ionisation chambers 3 each have two very thin aluminum windows 7 which are transparent to alpha rays and, if any alpha ray emitting material contaminates the hand 2, an ionisation current will be produced within the chambers 3 and recorded on the meter 5. The chambers 3 differ from those employed in monitor apparatus at the present time as described above in that in the known apparatus the ionisation chambers have a single thin window. If, after maintaining the hand between the ionisation chambers for a specific time, the meter 5 indication is below a set value, then the hand is not contaminated beyond a predetermined safety limit. Guard means (not shown) will in practice be provided to protect at least the two aluminum windows 7 bounding the cavity 1.

Due to the greater penetrating power of beta and gamma rays, if any beta and/or gamma ray emitting material contaminates the hand these rays will pass through the ionisation chambers 3 causing substantially no ionisation and will fall on the Geiger-Müller tubes 4, penetrate the glass envelope thereof and cause ionisation therein. The output currents of the various tubes 4 are added and supplied to the meter 6. Any alpha rays which pass through the chambers 3 will not give rise to ionisation within the tubes 4 since the rays will be absorbed in the glass envelopes of these tubes. As with the monitoring for alpha ray emitting materials, if the reading of the meter 6 is below a set value after maintaining the hand in position for a predetermined time, the hand is not contaminated above the safety limit. In the case, therefore when the predetermined time set for the two monitoring operations are the same it can be seen that apparatus in accordance with the invention provides a very considerable time saving as compared with the methods at present employed as described above.

What is claimed is:

1. In a radiation counter, the combination comprising a pair of ionisation chambers each having front and rear walls which are substantially transparent to alpha, beta and gamma radiations, said chambers being in substantially opposing relationship with their front walls defining a cavity therebetween for receiving a body emitting penetrating radiations including alpha, beta and gamma radiations, said ionization chambers containing an alpha-ionizable but beta- and gamma-transparent medium and being adapted to detect alpha radiation, and a plurality of independent Geiger-Müller counters separate from and positioned behind the rear wall of each of the ionization chambers remote from the cavity and each having a wall portion substantially transparent to beta and gamma radiations and positioned to receive radiations which pass through said ionization chambers, said Geiger-Müller counters being adapted to detect beta and gamma radiations.

2. In a radiation counter, the combination comprising a pair of flat ionization chambers each having front and rear walls which are substantially transparent to alpha, beta and gamma radiations, said chambers being in substantially opposing relationship with their front walls defining a cavity therebetween for receiving a body emitting penetrating radiations including alpha, beta and gamma radiations, said ionization chambers containing an alpha-ionizable but beta- and gamma-transparent medium and being adapted to detect alpha radiation, and a plurality of elongated independent Geiger-Müller counters separate from and positioned behind and generally parallel to the rear wall of each of the ionization chambers remote from the cavity and each having a wall portion substantially transparent to beta and gamma radiations but opaque to alpha radiation and positioned to receive radiations which pass through said ionization chambers, said Geiger-Müller counters being adapted to detect beta and gamma radiations.

References Cited in the file of this patent
UNITED STATES PATENTS

| | | |
|---|---|---|
| 2,509,700 | Simpson | May 30, 1950 |
| 2,727,154 | Goldsworthy | Dec. 13, 1955 |
| 2,735,946 | Stratford | Feb. 21, 1956 |
| 2,741,709 | Tirico et al. | Apr. 10, 1956 |
| 2,745,970 | Dewan | May 15, 1956 |
| 2,756,348 | Schneider | July 24, 1956 |
| 2,822,479 | Goldsworthy | Feb. 4, 1958 |
| 2,826,076 | Boreitz | Mar. 11, 1958 |
| 2,875,364 | Herzog | Feb. 24, 1959 |

OTHER REFERENCES

The Four-Fold Hand Counter by Brand et al., MDDC-899, Nov. 1, 1944, Technical Information Division, Oak Ridge, Tenn.